United States Patent

Neff

[11] Patent Number: 6,092,025
[45] Date of Patent: Jul. 18, 2000

[54] HYDROCARBON EDGE DETECTION USING SEISMIC AMPLITUDE

[75] Inventor: Dennis B. Neff, Bartlesville, Okla.

[73] Assignee: Phillips Petroleum Company, Bartlesville, Okla.

[21] Appl. No.: 09/196,470

[22] Filed: Nov. 19, 1998

[51] Int. Cl.[7] ................................................ G01V 1/40
[52] U.S. Cl. .................................. 702/10; 702/6; 702/11
[58] Field of Search ...................... 702/6, 7, 10; 367/38, 367/47, 51, 52, 75

[56] References Cited

U.S. PATENT DOCUMENTS

| | | | |
|---|---|---|---|
| 4,393,488 | 7/1983 | Gassaway et al. | 367/75 |
| 5,136,550 | 8/1992 | Chambers | 367/38 |
| 5,440,525 | 8/1995 | Dey-Sarker et al. | 367/52 |
| 5,453,958 | 9/1995 | Neff | 367/70 |
| 5,487,001 | 1/1996 | Neff | 364/421 |
| 5,551,881 | 9/1996 | Henderson et al. | 434/299 |
| 5,563,949 | 10/1996 | Bahorich et al. | 364/421 |
| 5,583,825 | 12/1996 | Carazzone et al. | 367/31 |
| 5,596,547 | 1/1997 | Bancroft | 367/51 |
| 5,661,697 | 8/1997 | Swan et al. | 367/47 |
| 5,706,194 | 1/1998 | Neff et al. | 364/421 |
| 5,784,334 | 7/1998 | Sena et al. | 367/47 |
| 5,835,882 | 11/1998 | Vienot et al. | 702/7 |
| 5,835,883 | 11/1998 | Neff et al. | 702/7 |
| 5,862,100 | 1/1999 | VerWest | 367/38 |

*Primary Examiner*—Christine Oda
*Assistant Examiner*—Victor J. Taylor
*Attorney, Agent, or Firm*—George E. Bogatie

[57] ABSTRACT

A computer implemented method and apparatus for discovering hydrocarbon bearing formations yields a direct indication of hydrocarbon resulting from analyzing seismic amplitude data. The method uses an algorithm for determining a seismic attribute known as delta amplitude dip (DAD) in which each sample point of each seismic trace in a survey is analyzed to determine a planar dip associated with the reflection point and a normalized delta amplitude in the direction of dip. Displaying the DAD values in time slice or horizon slice format provides a direct indicator of hydrocarbons. The inventive method automatically analyzes each digitized data point in the survey by cross correlating the traces reflected from a three-by-three array of reflection points. This method involves cross correlation of eight traces that are reflected from the perimeter of the three-by-three array of reflection points with the single trace reflected from the central point in the array. The correlation is carried out over a predefined time window, and for a series of lags. Then a dipping plane is trial fitted to amplitude events for the nine traces, including lagged traces, such that the cross correlation coherency of traces in the array is optimized for a particular strike and dip position of the dipping plane. The strike and dip of this optimum plane is recorded for later use in calculating the DAD value. The seismic amplitudes along the optimum plane are extracted and contoured. The delta amplitude in the direction of dip is then normalized by the amount of dip to give the DAD value for the center point of the plane. In another aspect of this invention, it has been discovered that conventional AVO data sets such as (A+B) or (A*B) can be used as inputs to DAD processing to further enhance displays used for seismic interpretation.

30 Claims, 6 Drawing Sheets

(3 of 6 Drawing Sheet(s) Filed in Color)

HYDROCARBON EDGE DETECTION USING SEISMIC AMPLITUDE

This invention relates to seismic prospecting for oil and gas reservoirs, and more specifically it relates to processing seismic data in a high speed digital computer using a combination of processing techniques including automated delta amplitude dip (DAD) and amplitude versus offset (AVO) techniques.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earths surface. Offshore, air gun sources and hydrophone receivers are commonly used. The acoustic waves generated in the earth by these sources are transmitted back from strata boundaries and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land an array of geophones is laid out along a grid covering an area of interest to form a group of spaced apart observation stations within a desired locality to enable construction of three dimensional (3D) views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. Accordingly, continuously recorded seismic field traces are reduced to vertical cross sections and/or horizontal map views which approximate subsurface structure. The geophone array is then moved along to a new position and the process is repeated to provide a seismic survey.

A seismic data processing technique referred to herein as delta amplitude dip (DAD) accentuates areas of waveform tuning in hydrocarbon filled porous formations, and is well suited for directly indicating the presence of hydrocarbons in those hydrocarbon containing formations. This DAD technique is disclosed in U.S. Pat. No. 5,543,958 issued to Dennis B. Neff, and the entire disclosure of this patent is incorporated herein by reference. According to the DAD approach, an attribute of a subsurface reflection point is determined from the delta amplitude in the direction of maximum dip, normalized by the amount of dip. This DAD value of a seismic attribute is derived from traces obtained from multipoint coverage of a dipping subsurface interface, and is used to identify the presence of hydrocarbons in the subsurface formations. While this DAD technique is considered to be a significant exploration and exploitation tool, it requires a preprocessing step of manually locating and picking horizons, and accordingly elimination of the preprocessing step so as to achieve a more fully automated DAD process would be highly desirable.

Also, it is well known by persons skilled in the art of seismic prospecting that the compressional P-wave reflection coefficient at an interface separating two media varies with the angle of incidence of seismic energy. A processing technique referred to as amplitude versus offset (AVO) is well known by those skilled in the art for relating the reflected amplitude variation to the presence of hydrocarbon accumulations in a subsurface formation. According to the AVO approach, attributes of a subsurface interface are determined from the dependence of the detected amplitude of seismic reflections on the angle of incidence of the seismic energy. This AVO approach determines both a normal incidence coefficient of seismic reflection, and a gradient component of seismic reflection, and the cross plotting of normal incidence amplitude and gradient data is often used in the method for identifying hydrocarbons. In an AVO processing technique, one derives the amplitude R of a reflected seismic wave from an interface as a function of the angle of incidence θ from the normal according to the equation:

$$R_{(\theta)} = A + B \sin^2 \theta$$

In this equation, the coefficient A is the normal incidence coefficient, and the coefficient B is the gradient component, which is representative of the rate of change of amplitude with the square of the sine of the angle of incidence.

AVO analysis and processing as an exploration tool for risk analysis has been significantly advanced in the last five years through better processing and presentation schemes. Accordingly, certain indicators derived from AVO analysis, such as using the positive A*B product as a direct indicator of hydrocarbons, have been successful in identifying the location of many gas and oil reservoirs. While using such indicators, however, many valid hydrocarbon AVO anomalies, which may be indicators of hydrocarbon, are overlooked because they are associated with medium or hard sand layers that do not and should not have a higher amplitude reflection in the far offsets. Also, false bright spots often remain after AVO processing. Particularly problematic in AVO processing are the medium porosity, or so called Class II sands, which frequently reverse polarity with greater offset when gaseous hydrocarbons are present in the formation.

In conventional DAD or AVO processing, multiple seismic traces are collected from source receiver pairs having different offsets and thus multiple angles of incident seismic energy, and where the collected signal traces are each reflected from a common subterranean reflection point. Such a group of traces is referred to as a common depth point (CDP) gather. Typically, seismic reflection points are midpoints between the source and receiver pair for various offsets, and as such this gather is also often referred to as a common midpoint (CMP) gather.

Accordingly it is an object of this invention to extract more useful subsurface information from seismic amplitude data without requiring information regarding actual properties of the rock.

It is a more specific object of this invention to more consistently distinguish sands and porous carbonates with hydrocarbon from surrounding formations.

Another more specific object of this invention is to better image the edges of hydrocarbon-bearing reservoirs.

It is a still further object of this invention to provide a method and system for improved processing of seismic data that is compatible with previously implemented AVO analysis techniques.

SUMMARY OF THE INVENTION

In accordance with the present invention, I have discovered that the preprocessing step of locating and picking horizons in DAD processing of seismic data can be automated, and further that AVO processing of seismic data can be improved by combining DAD and AVO techniques to generate displays which more accurately indicate the presence of hydrocarbons in subsurface formations. Most significantly, the automated DAD process is able to use AVO data sets such as (A+B) or A*B as input to the DAD algorithm. This provides a compounding effect that further enhances identification of prospective hydrocarbon reservoirs regardless of AVO class, (i.e., bright spot, dim spot, or polarity reversal) by greatly diminishing the amplitude of most non-prospective intervals such as shale and silts.

According to a first aspect of this invention, which is more fully automating the DAD technique, a method involves determining if a dipping reflection plane is associated with each depth point in a seismic survey. This method assumes that conventional data processing is applied to a 3D data survey up to and including migration and generation of CDP or CMP gathers of seismic traces. Then for each depth point in the seismic survey a cross correlation involves eight traces that are reflected from the perimeter of a three-by-three array of depth points, with the depth point under test being positioned in the center of the array. In this cross correlation the central trace is individually correlated with its eight adjacent traces and the correlation is carried out over a predefined time window, and for a series of lags. Next a dipping plane is fitted to the nine traces, including lagged traces, such that the cross correlation coherency of traces in the array is optimized for a particular strike and dip position of the dipping plane. The strike and dip of this optimal plane is recorded for later use in calculating the DAD value.

Next, amplitudes over the plane surface are determined. The intersected trace amplitudes at the corresponding nine traces of the array are then contoured, and an amplitude vector is determined in the direction of dip. The amplitude of the vector is then normalized by the amount of dip, as per the disclosure in the previously incorporated '958 patent, to calculate the DAD value. The thus calculated DAD value is then written to a DAD 3D data volume corresponding to the time position of the center depth point in the array. This process is then repeated for every trace and time/depth sample of the 3D volume.

According to a second aspect of this invention, conventional AVO data sets such as an (A+B) or A*B section are integrated with DAD processing so as to suppress false A*B anomalies which are often present in conventional A*B sections, but are not indicators of hydrocarbon. This combined DAD AVO method therefore provides interpretation enhancements which further reduce exploration risk compared to either DAD or AVO techniques used alone.

In yet another aspect of the invention apparatus comprises a computer programmed to implement the DAD algorithm using either field data or AVO data sets as inputs to the DAD algorithm. For large scale 3D exploration data, the computer is preferably a massively parallel machine.

Accordingly, the DAD algorithm is an expedient and effective method to enhance whatever hydrocarbon effect is present in 3D seismic data.

Still other objects and advantages of the present invention will become readily apparent to those skilled in the art from the following detailed description and the drawings, wherein there is shown and described only the preferred embodiments of this invention.

BRIEF DESCRIPTION OF THE DRAWINGS

The file of this patent contains at least one drawing executed in color. Copies of this patent with the color drawing will be provided by the Patent and Trademark Office upon request and payment of the necessary fee.

DETAILED DESCRIPTION OF THE INVENTION

Figure 2:
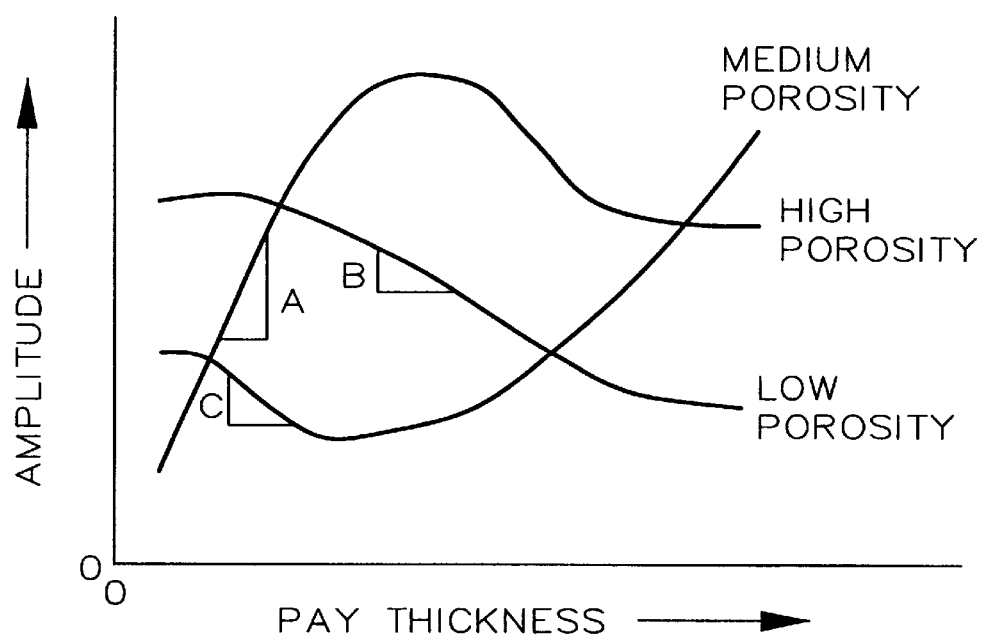
FIG. 2 is a graph illustrating seismic amplitude vs. pay thickness for three types of porous reservoirs.

Amplitude and structure maps have long been used to define the limits of hydrocarbon reservoirs, particularly when the reservoirs are associated with seismic "bright spots." Amplitude can, however, be ambiguous in reservoirs where the seismic response is a "dim spot" or a polarity reversal. The basic premise of th'AD algorithm is that hydrocarbons will most dramatically affect the seismic amplitudes when the data pass through a pay thickness that causes waveform tuning, and the maximum delta amplitude change will be seen on profiles that are dip oriented. FIG. 2 shows three possible amplitude tuning curves, i.e., for reservoirs with low, medium and high porosity. In each case, near the zero limit of pay thickness, the slope of the amplitude curve shown at letters A, B and C, is relatively high regardless of the initial amplitude value at zero pay thickness. Accordingly, by testing for the amplitude change at the edge of a reservoir, the ambiguity of a "bright spot" versus a "dim spot" play can be eliminated.

As previously mentioned, a seismic data processing technique which discloses the DAD algorithm to enhance detection of hydrocarbons is disclosed in the incorporated patent U.S. Pat. No. 5,542,958. According to the present invention, however, the method for locating hydrocarbon reservoirs disclosed in that patent is enhanced by automatically locating a dipping subterranean surface associated with each depth point in a seismic survey, which is necessary for DAD processing.

Figure 3:
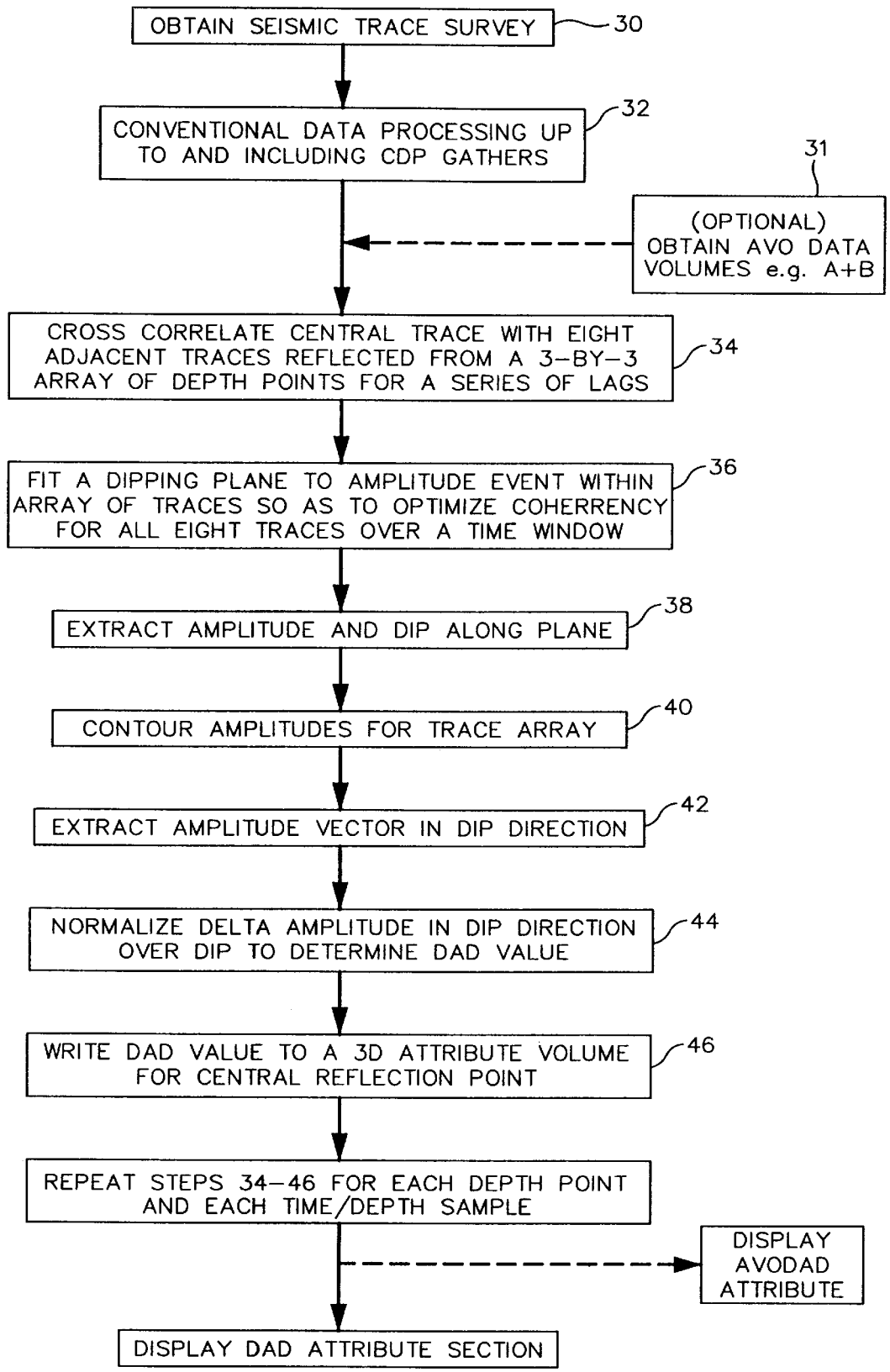
FIG. 3 is a simplified flow diagram illustrating programmed steps for a DAD algorithm used to create a DAD or an AVODAD display.

Referring now to FIG. 3, a first a step as shown in block 30 is to obtain a set of seismic data in the form of signal traces distributed over a volume of the earth, and then processing the data as shown in block 32. Methods by which such data is obtained, reduced to digital format, and processed up to and including migration and generation of CDP gathers of the seismic traces is well known to those skilled in the art.

The next step shown in block 34, is to cross correlate traces reflected from a three-by-three array of depth points in a seismic survey, and is applied to each time sample of each depth point in the survey. This correlation is carried out over a predetermined time window such as about 28 mmilliseconds, and compares the trace associated with the central depth point with each of eight perimeter traces, and for a series of lags of the 8 neighbor traces.

Figure 1:
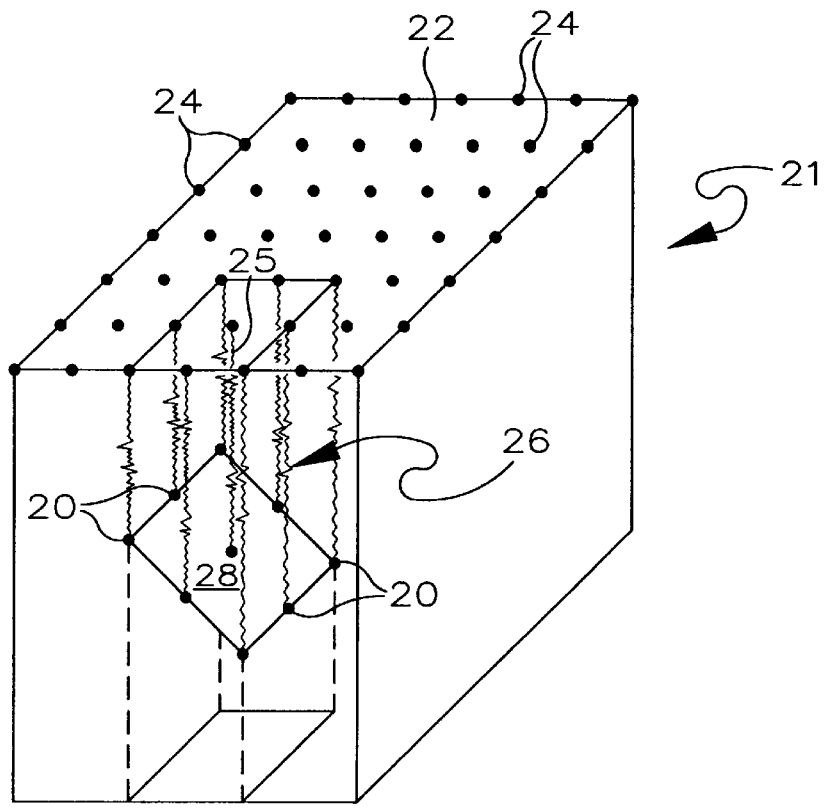
FIG. 1 is a perspective view of an arrangement of geophones for obtaining a seismic data volume, and further illustrates a three-by-three trace array for locating a dipping subsurface plane according to this invention.

This step is better illustrated in FIG. 1, which is a perspective view of a 3D seismic trace volume of the earth, and which shows an example of a nine-spot array of depth points illustrated at 20. Referring still to FIG. 1, a volume of the earth is generally illustrated at 21. On the surface of the earth 22 a large array of geophones is shown by the numerous circles 24. Also illustrated in more detail is the exemplary 3×3 array of geophones, which are shown with associated zero offset seismic traces generally illustrated at 26. While zero offset traces are illustrated at 26, in practice these traces can be stacked, migrated or AVO derived traces such as A+B or A*B. Further illustrated is the central trace 25. Although not illustrated, each geophone 24 has an associated trace, but for simplicity only the zero-offset traces 26 associated with the array are illustrated in FIG. 1. An example of a dipping plane, which is mathematically inserted in the array to linearly connect trial amplitude events in the array of traces 26 in FIG. 1, is illustrated at 28 in that figure.

Referring again to FIG. 3, and in particular to block 36, various locations of the dipping plane are tested using trace lagging techniques to adjust the strike and dip of the plane. The lagging technique generally limits the dip of the plane to not more than plus or minus forty-five degrees. The final position of the dipping plane is determined by selecting the location (strike and dip) of the plane that optimizes coherency of all eight traces that are cross correlated with the central trace.

Cross correlation of seismic data for comparing similarity of neighboring traces, as used in this invention, is well known to those skilled in the art. For further details regarding correlation see, for example, Anstey, N. A., "Correlation Techniques," Journal of the Canadian Society of Exploration Geophysists, 2, 55–82.

Figure 4:
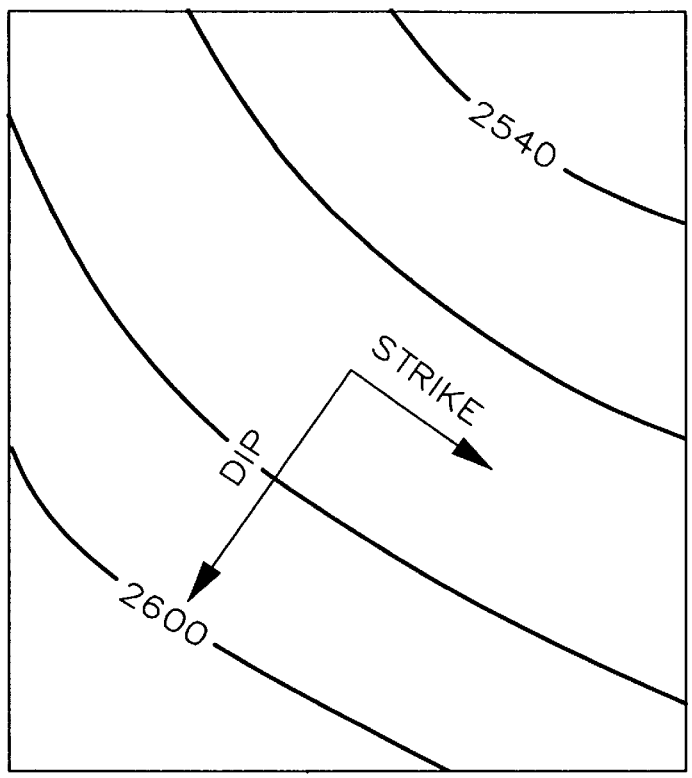
FIG. 4 is a structure contour map indicating the direction of strike and dip.
Figure 5:
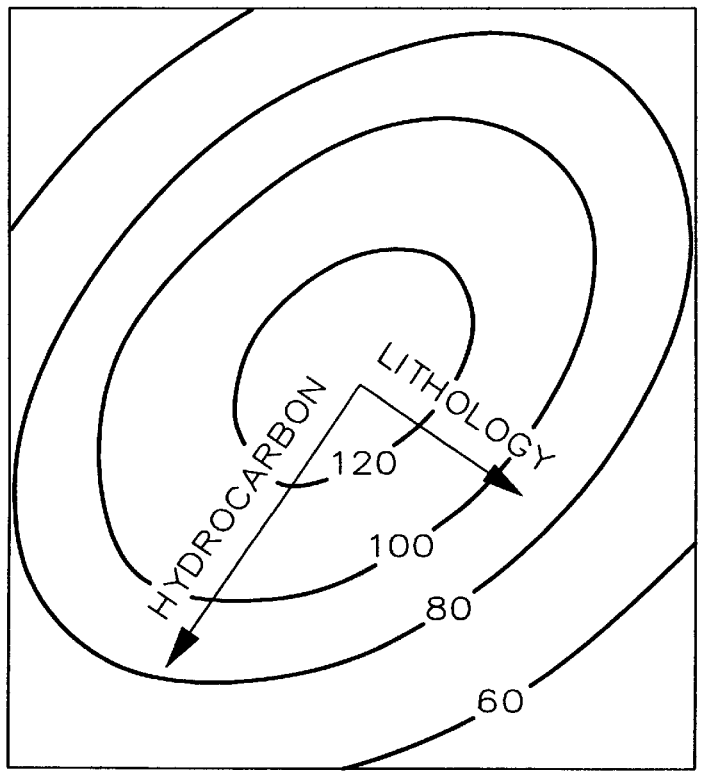
FIG. 5 is an amplitude contour map indicating that hydrocarbon effects are most indicative in the direction of dip.

Next as illustrated at 38 in FIG. 3, amplitudes are extracted along the DAD plane for the nine traces including, if necessary, interpolation along the traces between sample points, and then the extracted amplitudes are contoured as stated in block 40. A structure contour map showing an example of strike and dip of a surface is illustrated in FIG. 4. Advancing to block 42, an amplitude vector is determined in the direction of dip, and in block 44 the normalized delta amplitude over dip (i.e., the DAD value) is determined. In the normalization algorithm of block 44, a lower and an upper limit are applied to dip to avoid division by zero or other unrealistic results. This amplitude normalization is more fully described in the previously incorporated patent.

According to the second aspect of this invention a DAD algorithm is applied to AVO data sets as shown in the optional input block 31 to the DAD algorithm in FIG. 3. Conventional AVO analysis is well known in the art, and more recently developed AVO data sets such as (A+B) and A*B can provide input data sets for DAD analysis. A method for hydrocarbon detection using AVO analysis is disclosed in U.S. Pat. No. 5,784,334 issued to A. G. Sena et al., the disclosure of which relating to conventional AVO analysis resulting in creation of direct hydrocarbon indicators such as A*B data sets, is incorporated herein by reference.

EXAMPLE MAPS

Any surface for which time or depth structure and an amplitude horizon exist can be converted to a DAD map, wherein high DAD values that parallel structural contours represent prospective hydrocarbon edges. The following examples were performed in conjunction with seismic workstation displays such as SeisWorks, available from Landmark Graphics Corporation of Houston, Tex.

This example compares conventional amplitude, DAD and A+B DAD timeslices.

Figure 6:
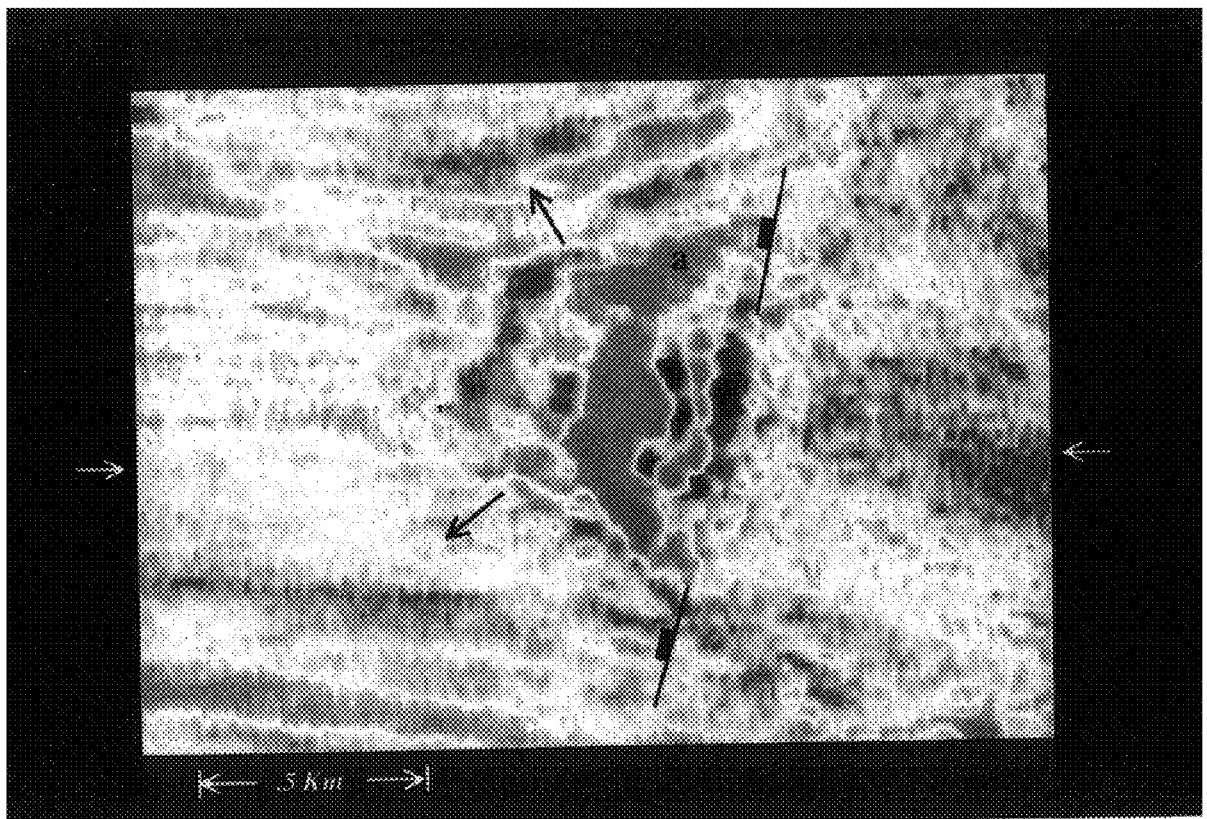
FIG. 6 is a color display of a conventional amplitude timeslice.
Figure 7:
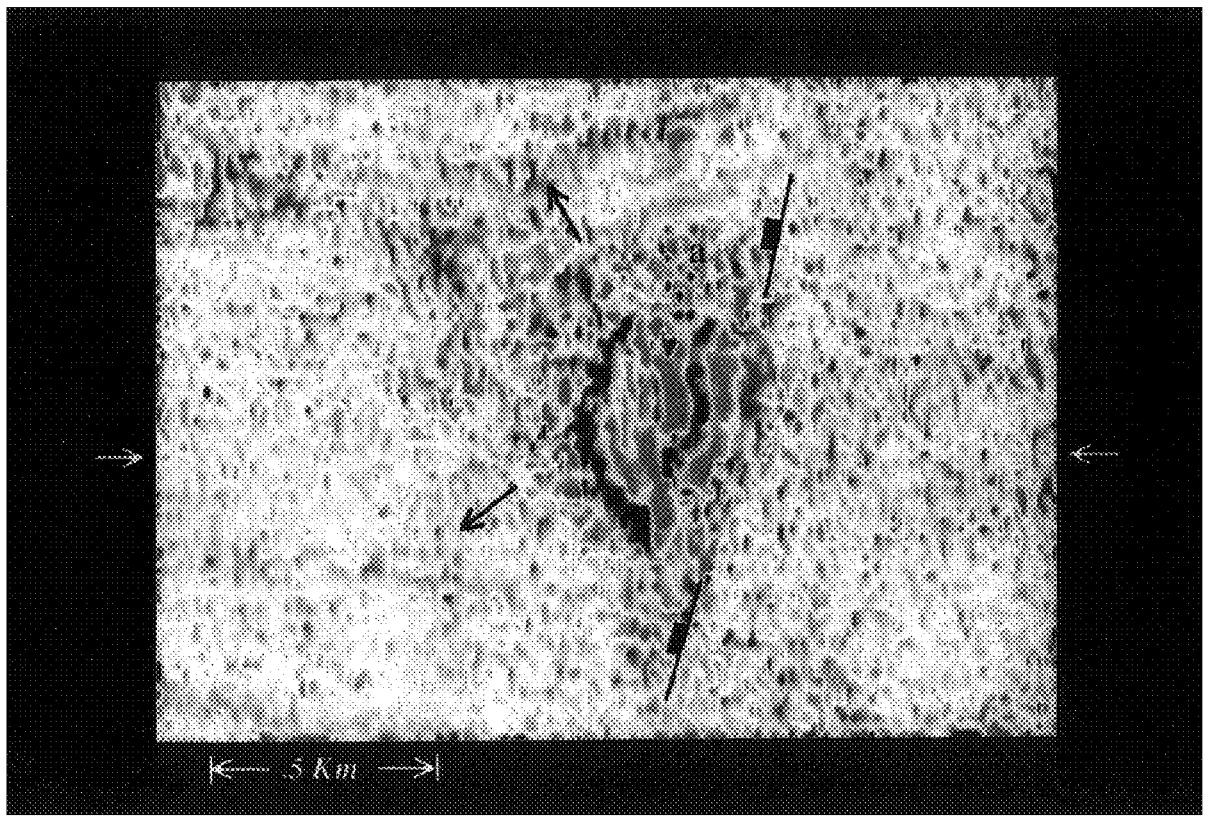
FIG. 7 is a color display of the data in FIG. 6 with DAD processing.
Figure 8:
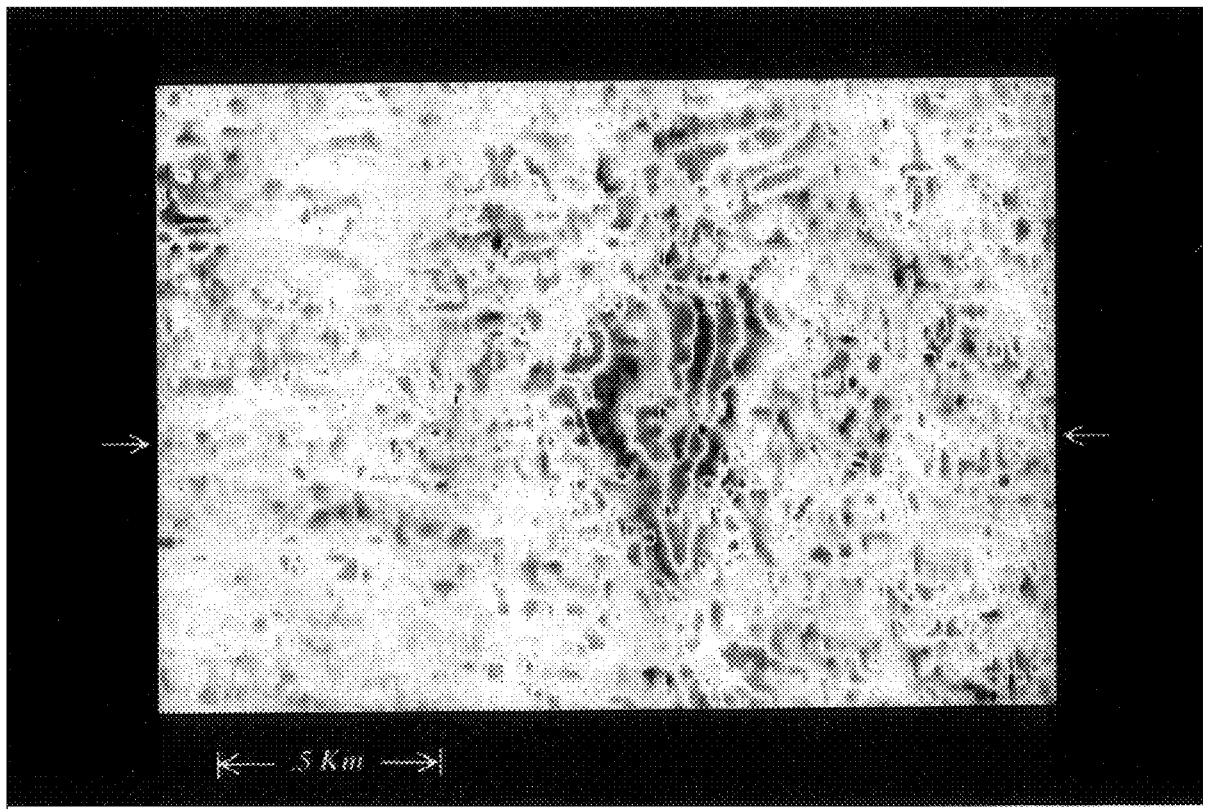
FIG. 8 is a color display with A+B DAD processing.

FIG. 6 is an example of a conventional seismic amplitude timeslice in two colors representing positive and negative polarity. This map is coincident with a gas/water contact in a high porosity sandstone reservoir and shows high amplitude, which includes the red area at the letter "a". FIG. 7 which is the equivalent DAD timeslice of FIG. 6, has a bright blue event coincident with the structural limit of the reservoir and a bright red lineation coincident with the updip fault bounded edge. Elevated DAD values are not present at the letter "a", which area is beyond the limits of this productive reservoir. FIG. 8 shows the further improvement of A+B DAD timeslices at this gas/water contact. This figure has amplitude contrasts for hydrocarbon indicators which are five to ten times brighter as compared to the background levels.

The invention as described and illustrated herein is an effective method and apparatus to enhance whatever hydrocarbon edge effect may be present in 3D seismic data and accordingly provides interpretation enhancements which reduce exploration risks. However, those skilled in the art will recognize that many modifications and variations of this invention are possible in light of the above teachings without departing from the spirit of the invention. It is understood that the present invention is not intended to be limited by the particular features described and illustrated in the specification and drawings but the concept of this invention is to be measured by the scope of the appended claims.

That which is claimed is:

1. A method for determining strike and dip of a plane for association with a reflection point on a subterranean surface, wherein said method for determining is based on seismic amplitude analyses of common depth point (CDP) gathered seismic traces included in a three-dimensional (3D) seismic survey, said method comprising:

(a) cross correlating each of eight perimeter traces with a central trace for a plurality of lags, wherein said eight perimeter traces and said central trace are reflected from a three-by-three array of nine reflection depth points in said seismic survey;

(b) fitting said plane to a plurality of amplitude events of traces reflected from said array of nine depth points so as to optimize cross correlation coherency of said eight traces with said central trace over a predefined time window;

(c) determining a strike and dip for the optimum position of said plane as determined in step (b);

(d) associating said strike and dip determined in step (c) with said central point in said array of nine reflection depth points; and (e) repeating steps (a) through (d) for a plurality of reflection points.

2. A method in accordance with claim 1 for determining a delta amplitude dip (DAD) value for said central reflection point, said method additionally comprising the following steps:

determining a delta amplitude value in the direction of dip for said central point;

normalizing said delta amplitude by said dip to determine said DAD value; and displaying said DAD values.

3. A method in accordance with claim 2, wherein said step of displaying said DAD values comprises:

presenting displays selected from the group of displays consisting of timeslices and horizon slices.

4. A method in accordance with claim 1, wherein said steps (a) through (d) are performed for each time/depth sample for all of said CDP gathered traces in said survey.

5. A method in accordance with claim 1, wherein said plurality of lags applies only to said eight perimeter traces.

6. A method in accordance with claim 1, wherein said predefined time window comprises a window of about twenty-eight milliseconds.

7. A method in accordance with claim 1, wherein said step of fitting said plane is limited to fitting planes dipping less than forty-five degrees.

8. A method for enhancing display of hydrocarbon edge effects in a reservoir using seismic amplitude displays derived from a three-dimensional (3D) seismic survey, said method comprising:

(a) obtaining an amplitude-vs-offset (AVO) data set including an AVO value for each sample point associated with CDP reflected traces in said 3D seismic survey;

(b) applying a delta-amplitude-dip (DAD) algorithm to said AVO data set, said DAD algorithm comprising:

(i) cross correlating each of eight perimeter traces with a central trace for a plurality of lags, wherein said eight perimeter traces and said central trace are associated with CDP reflected traces from a three-by-three array of nine reflection depth points in said seismic survey;

(ii) fitting said plane to a plurality of amplitude events of said nine traces so as to determine a location for said plane in said array of traces that optimizes cross correlation coherency of each of said eight traces with said central trace over a predefined time window; and (iii) determining a strike and dip for the optimum position of said plane as determined in step (ii);

(iv) associating said strike and dip determined in step (iii) with said central point in said array of nine reflection depth points;

(v) determining amplitude values along said plane;

(vi) determining a delta amplitude in the direction of dip at said central point normalized by the dip of said plane to determine said DAD value; and (c) displaying said DAD values.

9. A method in accordance with claim 8, wherein said step of displaying said DAD values comprises:

presenting displays selected from the group of displays consisting of timeslices and horizon slices.

10. A method in accordance with claim 8, wherein said predefined time window comprises a time window of about twenty-eight milliseconds.

11. A method in accordance with claim 8, wherein said steps (i) through (vi) are performed for each time/depth sample for all of said CDP gathered traces in said seismic survey.

12. A method in accordance with claim 8, wherein said plurality of lags applies only to said eight perimeter traces.

13. A method in accordance with claim 8, wherein said step of fitting said plane is limited to fitting planes dipping less than forty-five degrees.

14. Apparatus for determining strike and dip of a plane for association with a reflection point on a subterranean surface, wherein a method for determining said plane is based on seismic amplitude analyses of a common depth point (CDP) gather of seismic traces included in a three-dimensional (3D) seismic survey, said apparatus comprising:

a computer programmed to carry out the following method steps:

(a) cross correlating each of eight perimeter traces with a central trace for a plurality of lags, wherein said eight perimeter traces and said central trace are reflected from a three-by-three array of nine reflection depth points in said seismic survey;

(b) fitting said plane to a plurality of amplitude events of traces reflected from said array of nine depth points so as to optimize cross correlation coherency of said eight traces with said central trace over a predefined time window;

(c) determining a strike and dip for the optimum position of said plane as determined in step (b);

(d) associating said strike and dip determined in step (c) with said central point in said array of nine reflection depth points; and (e) repeating steps (a) through (d) for a plurality of reflection points.

15. Apparatus in accordance with claim 14 for determining a delta amplitude dip (DAD) value for said central reflection point, said apparatus additionally comprising the following method steps programmed in said computer:

determining a delta amplitude value in the direction of dip for said central point;

normalizing said delta amplitude by said dip to determine said DAD value; and displaying said DAD values.

16. Apparatus in accordance with claim 15, wherein said programmed method step of displaying said DAD values comprises:

presenting displays selected from the group of displays consisting of timeslices and horizon slices.

17. Apparatus in accordance with claim 14, wherein said programmed method steps (a) through (d) are performed for each time/depth sample for all of said CDP gathered traces in said survey.

18. Apparatus in accordance with claim 14, wherein said plurality of lags applies only to said eight perimeter traces.

19. Apparatus in accordance with claim 14, wherein said predefined time window comprises a window of about twenty-eight milliseconds.

20. Apparatus in accordance with claim 14, wherein said CDP gather of seismic traces is a data set resulting from an AVO analysis of said CDP gather, and wherein said AVO analysis is based on a mathematical operation involving a normal incidence coefficient A and a gradient component B in an equation which derives the reflected amplitude R of a seismic wave, and wherein said equation is of the form:

$$R_{(\theta)} = A + B \sin^2 \theta.$$

21. A program storage device, readable by a computer, tangibly embodying a program of instructions executable by said computer to perform method steps for determining strike and dip of a plane for association with a reflection point on a subterranean surface, wherein said method for determining strike and dip of said plane is based on seismic amplitude analyses of a common depth point (CDP) gather of seismic traces included in a three-dimensional (3D) seismic survey, said method steps comprising:

(a) cross correlating each of eight perimeter traces with a central trace for a plurality of lags, wherein said eight perimeter traces and said central trace are reflected from a three-by-three array of nine reflection depth points in said seismic survey;

(b) fitting said plane to a plurality of amplitude events of traces reflected from said array of nine depth points so as to optimize cross correlation coherency of said eight traces with said central trace over a predefined time window;

(c) determining a strike and dip for the optimum position of said plane as determined in step (b);

(d) associating said strike and dip determined in step (c) with said central point in said array of nine reflection depth points; and (e) repeating steps (a) through (d) for a plurality of reflection points.

22. A device in accordance with claim 21 for determining a delta amplitude dip (DAD) value for said central reflection point, said device additionally comprising the following method steps programmed in said computer:

determining a delta amplitude value in the direction of dip for said central point;

normalizing said delta amplitude by said dip to determine said DAD value; and displaying said DAD values.

23. A device in accordance with claim 21, wherein said method step of displaying said DAD values comprises:

presenting displays selected from the group of displays consisting of timeslices and horizon slices.

24. A device in accordance with claim 21, wherein said programmed method steps (a) through (d) are performed for each time/depth sample for all of said CDP gathered traces in said survey.

25. A device in accordance with claim 21, wherein said plurality of lags applies only to said eight perimeter traces.

26. A device in accordance with claim 21, wherein said predefined time window comprises a time window of about twenty-eight milliseconds.

27. A device in accordance with claim 21, wherein said CDP gather of seismic traces is a data set resulting from an AVO analysis of said CDP gather, and wherein said AVO analysis is based on a mathematical operation involving a normal incidence coefficient A and a gradient component B in an equation which derives the reflected amplitude R of a seismic wave, and wherein said equation is of the form:

$$R_{(\theta)} = A + B \sin^2 \theta.$$

28. A method in accordance with claim 1, wherein said three-by-three array of nine reflection depth points comprises a rectangular array of depth points.

29. A method in accordance with claim 8, wherein said three-by-three array of nine reflection depth points comprises a rectangular array of depth points.

30. A method in accordance with claim 14, wherein said three-by-three array of nine reflection depth points comprises a rectangular array of depth points.

* * * * *